(12) United States Patent
Nakamura et al.

(10) Patent No.: US 6,597,930 B2
(45) Date of Patent: *Jul. 22, 2003

(54) COMMUNICATION APPARATUS HAVING A RETRACTABLE ANTENNA AND METHOD OF OPERATING THE COMMUNICATION APPARATUS

(75) Inventors: Atsunori Nakamura, Tokyo (JP); Kentarou Nakade, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/469,361

(22) Filed: Dec. 22, 1999

(65) Prior Publication Data

US 2003/0078068 A1 Apr. 24, 2003

(30) Foreign Application Priority Data

Dec. 25, 1998 (JP) .......................................... 10-371322

(51) Int. Cl.⁷ ................................................ H04B 1/38
(52) U.S. Cl. ....................................... 455/575; 455/129
(58) Field of Search ........................... 455/575, 89, 90, 455/129, 550; 343/702

(56) References Cited

U.S. PATENT DOCUMENTS 5,710,985 A * 1/1998 Matsumoto .................. 455/89
5,898,933 A * 4/1999 Kaschke ..................... 455/575
5,923,297 A * 7/1999 Kim et al. ................... 343/702
6,002,943 A * 12/1999 Irvin et al. .................. 455/522
6,006,117 A * 12/1999 Hageltorn et al. .......... 455/575
6,163,682 A * 12/2000 Lee ............................. 455/90
6,233,468 B1 * 5/2001 Chen .......................... 455/569

FOREIGN PATENT DOCUMENTS

| GB | 2 293 727 A | 4/1996 |
| JP | 4-167741 | 6/1992 |
| JP | 4-352521 | 12/1992 |
| JP | 5-76147 | 10/1993 |
| JP | 7-30956 | 1/1995 |
| JP | 7-505263 | 6/1995 |
| JP | 8-18478 | 1/1996 |
| JP | 8-251663 | 9/1996 |
| JP | 8-265407 | 10/1996 |
| JP | 9-172388 | 6/1997 |
| JP | 9-270613 | 10/1997 |
| JP | 9-312873 | 12/1997 |

* cited by examiner

Primary Examiner—Vivian Chin
Assistant Examiner—Tu Nguyen
(74) Attorney, Agent, or Firm—Sughrue Mion, PLLC

(57) ABSTRACT

Extraction of a retractable antenna 10 from a cabinet is detected by an antenna containing unit 20. When the extraction of the retractable antenna 10 is detected, a control unit 40 controls a communication function unit 30 to request a channel connection.

20 Claims, 10 Drawing Sheets

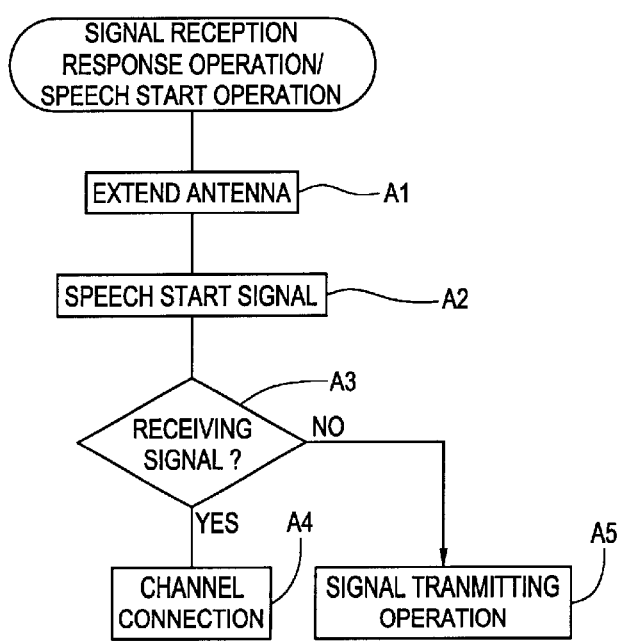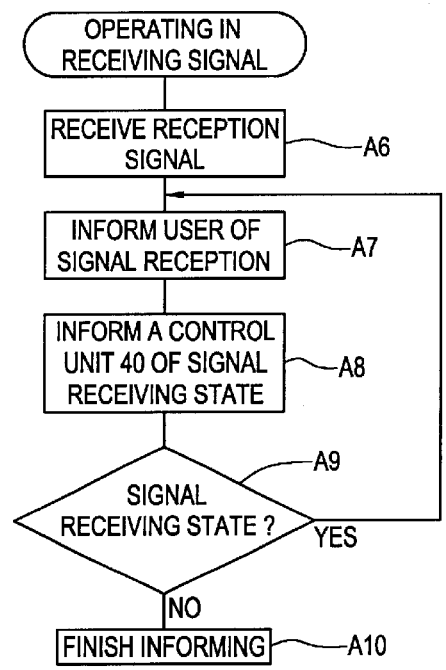

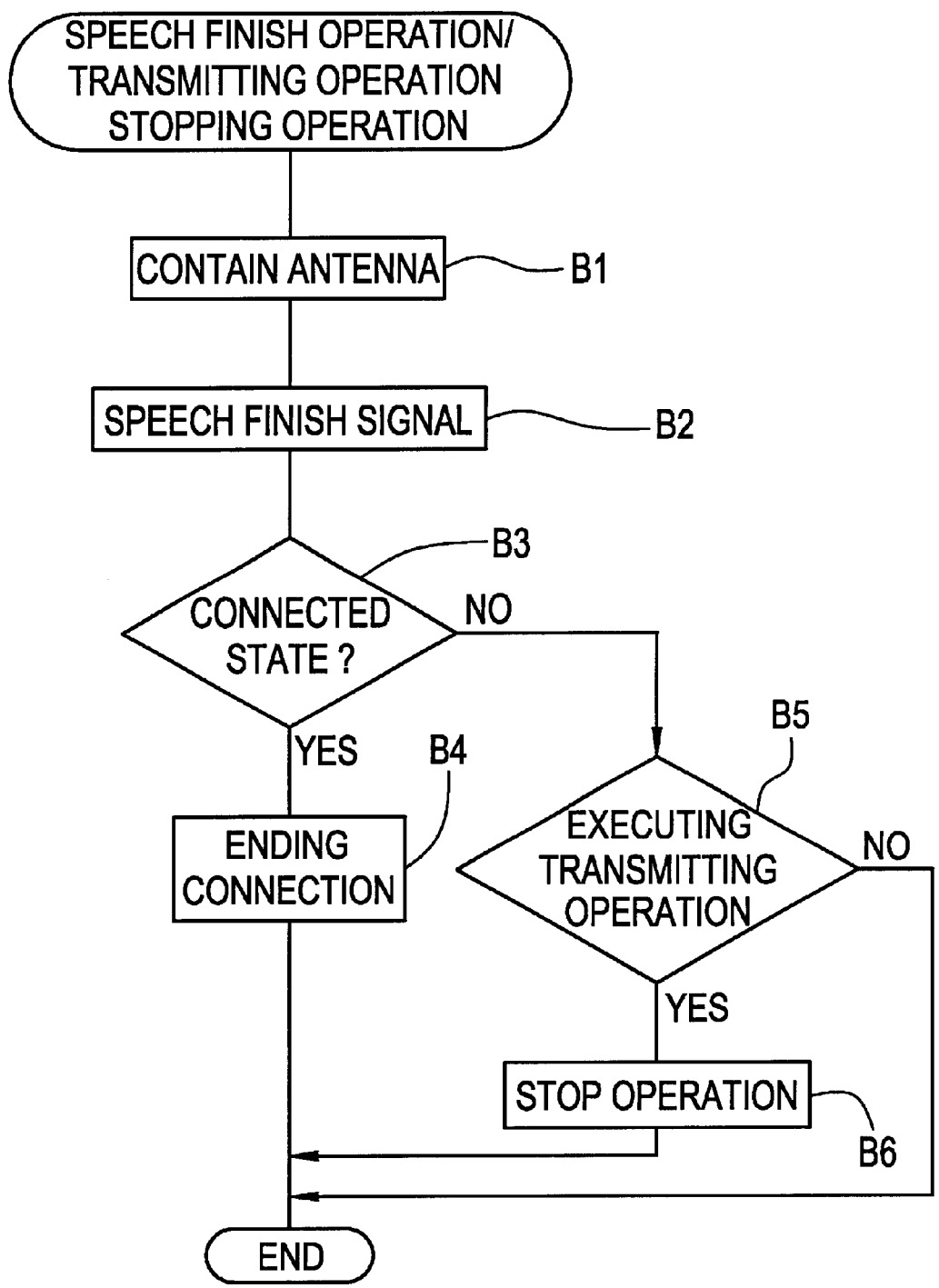

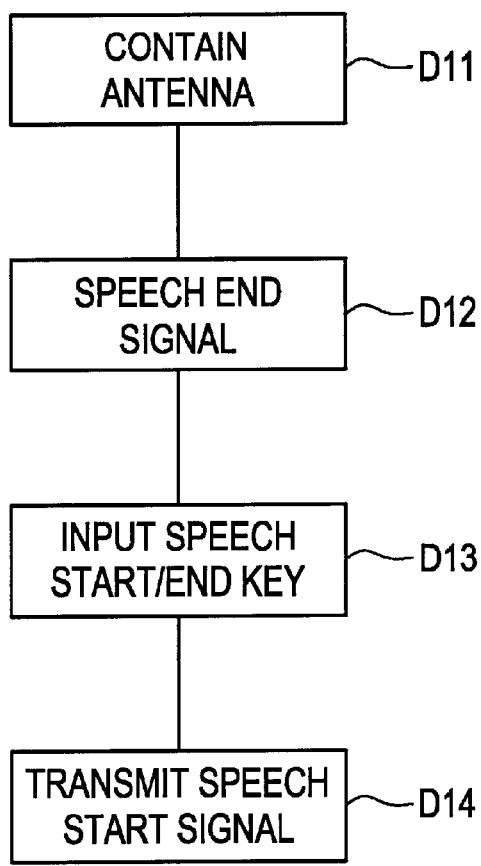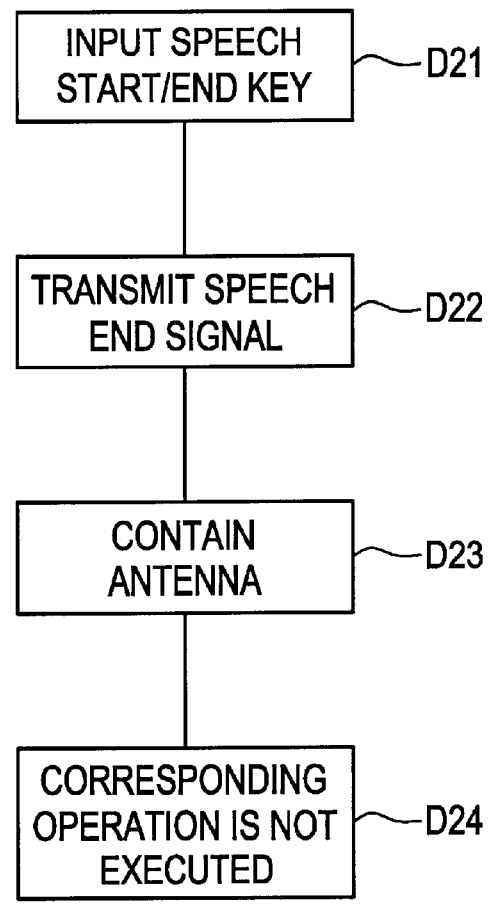

COMMUNICATION APPARATUS HAVING A RETRACTABLE ANTENNA AND METHOD OF OPERATING THE COMMUNICATION APPARATUS

BACKGROUND OF THE INVENTION

1. Field of the Invention

The present invention relates to a communication apparatus having a retractable antenna and a method of operating the communication apparatus. More particularly, it relates to a communication apparatus capable of operating in response to extraction and retraction of an antenna and a method of operating a communication apparatus according to extraction and retraction of an antenna.

2. Description of the Related Art

According to a conventional communication apparatus such as a portable telephone, when the portable telephone receives a signal from a communication system's base station, a user of the portable telephone depresses a start key or and the like installed on the portable telephone's cabinet by which an operation in response to the received signal is executed to thereby shift to a speech state.

According to the conventional portable telephone, when the user starts speaking in response to signal reception from the base station, two operations must be performed: depressing the start key for responding to the received signal, and thereafter extracting an antenna for improving the signal transmission and reception sensitivity of a radio wave signal communicating with the base station.

When the portable telephone is used in a dark place, it is difficult to recognize the position of the start key, thereby making it difficult to respond to the received signal.

A conventional portable telephone is disclosed in Japanese Unexamined Patent Publication No. 8-18478. According to this conventional portable telephone, the conventional portable telephone has a containable antenna, and the antenna is automatically extracted in cooperation with operation of an operation key necessary for speech.

Another conventional portable telephone is disclosed in Japanese Unexamined Patent Publication No. 8-251663. This conventional portable telephone is capable of being brought into a speech state by extracting an antenna from a contained state to outside of the portable telephone's cabinet when a signal is received from a base station. However, it does not request a channel connection in response to extracting the antenna if no signal is received from the base station.

Still another conventional portable telephone is disclosed in Japanese Unexamined Patent Publication No. 9-172388. This conventional portable telephone is capable of automatically extracting and retracting a retractable antenna from a car body in accordance with the telephone's state of use.

Yet another portable telephone is disclosed in Japanese Unexamined Patent Publication No. 9-270613. This conventional portable telephone automatically contains an antenna in response to end of speech and automatically extracts the antenna in response to reception of call from a base station.

However, according to the above-described conventional portable telephone disclosed in Japanese Unexamined Patent Publication No. 8-251663, despite having a circuit for detecting the state of an extractable antenna, detection of the extraction state of the antenna by the detecting circuit is limited to detecting of the state of the antenna only when a signal is received from a base station and only when the speech start operation is performed. In addition, according to other conventional portable telephones as described above, the antenna per se is automatically extracted or retracted in correspondence with a speech start operation or a speech end operation.

Further, there is no cooperation between the speech start operation initiated by depression of a speech start key installed on a main body of a portable telephone, and the speech start operation initiated by extracting or retracting the antenna. Moreover, it is pointed out that the conventional technology is devoid of practical performance.

SUMMARY OF THE INVENTION

It is an object of the present invention to provide a communication apparatus having a retractable antenna and a method of operating the communication apparatus capable of detecting a state of extracting and/or retracting an antenna and executing an operation in correspondence with the state.

It is another object of the present invention to provide a communication apparatus having a retractable antenna and a method of operating the communication apparatus for bringing about cooperating performance between an operation initiated by extracting or retracting an antenna and an operation of depressing a speech start/finish key at a surface of the mobile machine.

In order to achieve the above objects, a communication apparatus according to the present invention comprises a retractable antenna and a controller requesting a channel connection in response to extraction of the retractable antenna if a signal for establishing a channel connection is not received via the retractable antenna, and replying to the signal for establishing a channel connection in response to extraction of the retractable antenna, if the signal is received via the retractable antenna, whereby the channel connection is established.

A mobile station according to the present invention comprises a body, a containable antenna disposed in the body, a controller for executing a speech start operation in response to extraction of the containable antenna from the body and requesting a channel connection if a signal for establishing a channel connection is not received.

A method of operating a communication apparatus according to the present invention comprises the steps of detecting a state of a retractable antenna retractable with respect to a body, requesting a channel connection when extraction of the retractable antenna from the body is detected, if a signal for establishing a channel connection is not received through the retractable antenna.

BRIEF DESCRIPTION OF THE DRAWINGS

These and other objects, features and advantages of this invention will become more fully apparent from the following detailed description taken with the accompanying drawings in which:

FIG. 4A is a flowchart showing an operation performed in response to a received signal and a speech start operation of the first embodiment according to the present invention.

FIG. 4B is a flowchart showing an operation performed in response to a receiving a signal of the first embodiment according to the present invention.

FIG. 5 is a flowchart showing a speech end operation and a transmission stopping operation of the first embodiment according to the present invention.

FIG. 8A is a flowchart showing an operation of the second embodiment according to the present invention when the speech start/end key shown in FIG. 6 is input after an antenna containing operation is performed.

FIG. 8B is a flowchart showing an operation of the second embodiment according to the present invention when an antenna containing operation is executed after inputting the speech start/end key shown in FIG. 6.

DETAILED DESCRIPTION OF THE PREFERRED EMBODIMENTS

Figure 1:
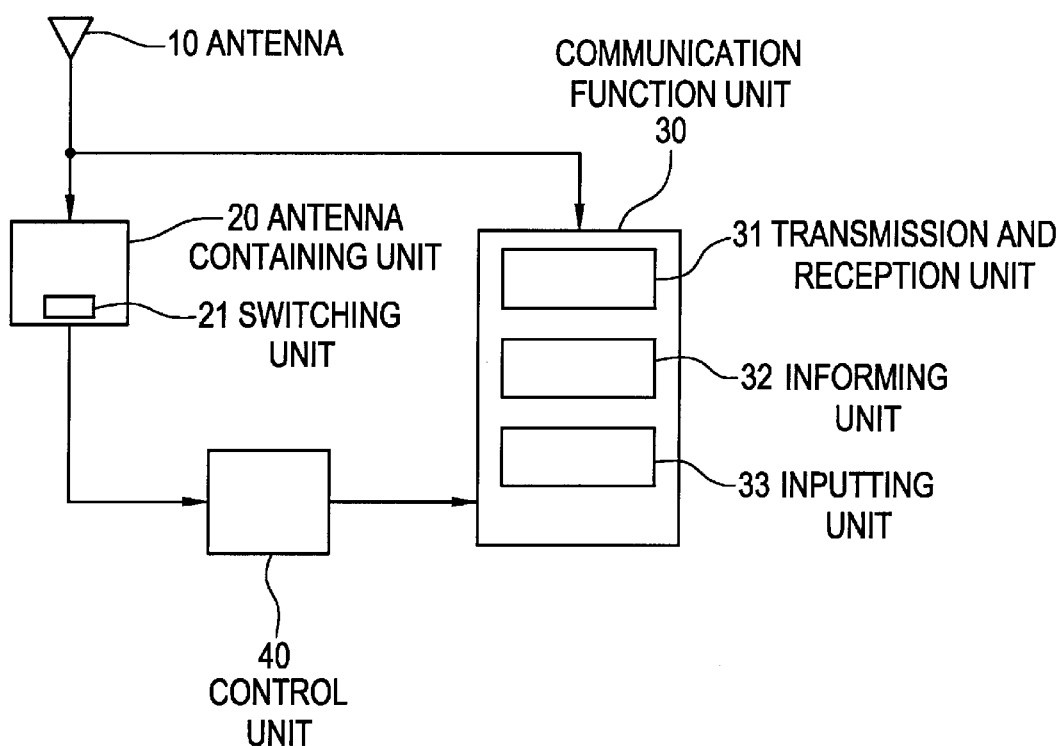
FIG. 1 is a block diagram showing a first embodiment of a communication apparatus according to the present invention.

Next, preferred embodiments of the present invention will be described referring to the drawings.

First, a constitution of a first embodiment according to the present invention will be discussed below in reference to the drawing.

In reference to FIG. 1, a communication apparatus according to the present invention includes a retractable antenna 10, an antenna containing unit 20, a communication function unit 30 and a control unit 40.

The retractable antenna 10 executes transmission and reception of a signal to and from a base station, and can be extended from the antenna containing unit 20 and contained into the antenna containing unit 20 by a user of the communication apparatus.

The antenna containing unit 20 relates to containment and extension of the retractable antenna 10 and detects an antenna retracting and extracting operation by the user or a contained and extracted state of the retractable antenna. A switching unit 21 which is contained in the antenna containing unit 20 transmits a detection signal to the control unit 40 in correspondence with the retracting and extending operation or a contained and extended state of the antenna 10.

The communication function unit 30 relates to hardware and operation of the communication apparatus and comprises a transmission and reception unit 31 for executing transmission and reception of a signal to and from the base station (not shown) via the antenna 10, an informing unit 32 for transmitting information such as signal reception to a user and an inputting unit 33 used for inputting a telephone number or the like by the user.

Examples of the informing unit 32 are means for informing signal reception by generating an alarm sound as an auditory indicator, means for informing signal reception by using lighting and extinguishing a LED as a visual indicator, and means for informing signal reception by vibrating the communication apparatus per se. At least one of these informing means can be used as the informing unit 32.

The inputting unit 33 comprises a keyboard having a power source switch used as an ON/OFF control of a power source to a communication apparatus and a plurality of input keys used in inputting a telephone number or the like.

The control unit 40 controls the communication function unit 30 by receiving the detection signal from the switching unit 21.

An example of the communication apparatus is a mobile station of a portable telephone or the like.

Next, a first specific example showing the retractable antenna 10, the antenna containing unit 20 and the control unit 40 of the communication apparatus according to the first embodiment of the present invention will be discussed below.

Figure 2A:
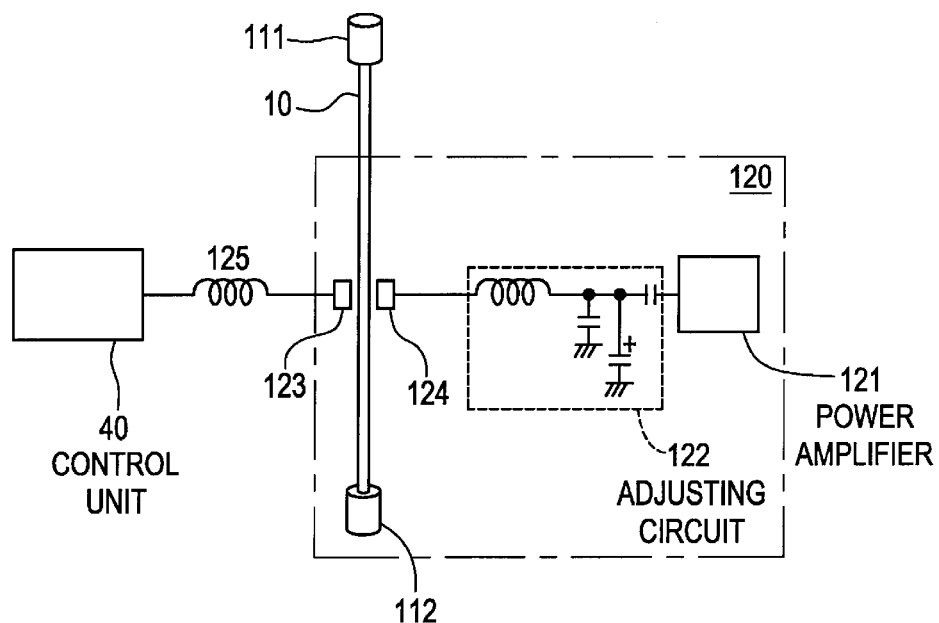
FIG. 2A illustrates a first specific example of a first embodiment of a communication apparatus according to the present invention when a antenna is contained.
Figure 2B:
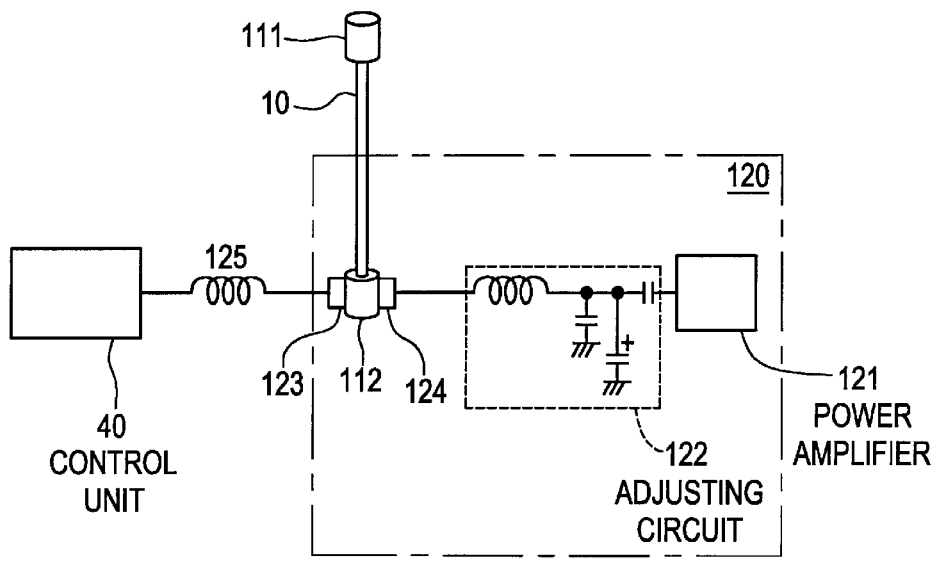
FIG. 2B illustrates the first specific example of the first embodiment of a communication apparatus according to the present invention when the antenna is extracted.

FIGS. 2A and 2B show diagrams illustrate the first specific example showing the retractable antenna 10, the antenna containing unit 20, including a board 120, and the control unit 40. FIG. 2A shows the retractable antenna when it is in its contained state and FIG. 2B shows the retractable antenna when it is in its extended state.

According to FIG. 2A, the retractable antenna 10 is provided with a front end portion 111 and a power feeding portion 112 at both ends thereof. The front end portion 111 is usually exposed to outside of a cabinet (not shown) of the communication apparatus and the power feeding portion 112 is usually disposed inside of the cabinet of the communication apparatus. Further, the power feeding portion 112 is made of a conductive material.

The antenna containing unit 20 includes a printed wiring board 120. The printed wiring board 120 is provided with a power amplifier 121 for supplying voltage, an adjusting circuit 122 for adjusting the voltage from the power amplifier 121 and a pair of power feeding switches 123 and 124 which are arranged with respect to the retractable antenna 10 without being connected to each other. The power feeding switches 123 and 124 are made of a conductive material. Generally, each of the power feeding switches 123 and 124 comprises a metal piece having a channel-type shape installed on the printed wiring board 120. A portion of the feeding switches 123 and 124 in contact with the power feeding portion 112 is deformed when they are brought into contact therewith and the portion recovers when they are no longer held in contact with the power feeding portion 112.

On the printed wiring board 120, the power feeding switch 124 is connected to the power amplifier 121 via the adjusting circuit 122. The power feeding switch 123 is connected to the control unit 40 via a choke coil 125.

When the retractable antenna 10 is contained in the cabinet of the communication apparatus as shown in FIG. 2A, the power feeding switches 123 and 124 are brought into an electrically noncontact state and the voltage applied by the power amplifier 121 is dropped to Ground by the adjusting circuit 122. Accordingly, the voltage applied by the power amplifier 121 is not supplied to the control unit 40.

When the retractable antenna 10 is extended from the cabinet as shown in FIG. 2B, by bringing the power feeding switches 123 and 124 into contact with the power feeding portion 112, two ends of the power feeding switches 123 and 124 are electrically connected. Accordingly, the voltage applied by the power amplifier 121 is supplied to the control unit 40 as the detection signal. By receiving the detection signal, the control unit 40 executes control to the communication function unit 30.

Alternatively, the two ends of the power feeding switches 123 and 124 may be installed at positions where they are simultaneously brought into contact with the power feeding portion 112 when the retractable antenna 10 is contained. In this case, the retracting operation by the user or the contained state of the retractable antenna 10 is detected thereby to supply the detection signal to the control unit 40. Still alternatively, the two ends of the power feeding switches 123 and 124 can be installed at positions where they are simultaneously brought into contact with the power feeding portion 112 at a midway between when the retractable antenna 10 is contained and when the retractable antenna 10 is extended.

In these cases, states of extracting and containing the retractable antenna 10 in supplying the voltage supplied from the power amplifier 121, indicative of the detection signal, to the control unit 40 are different from those shown in FIGS. 2A and 2B. Accordingly, the operation of the control unit 40 needs to set in correspondence with those respective cases.

Next, a second specific examples of the retractable antenna 10, the antenna containing unit 20 and the control unit 40 will be discussed below.

Figure 3A:
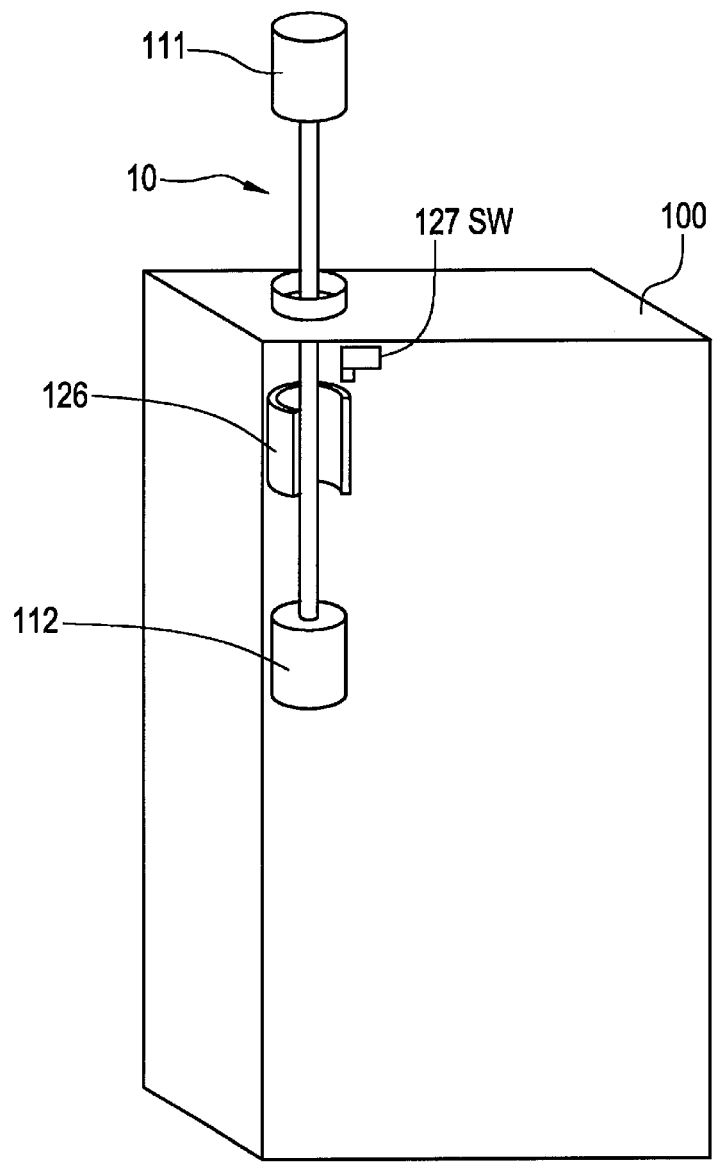
FIG. 3A illustrates a second specific example of the first embodiment of a communication apparatus according to the present invention when the antenna is contained.
Figure 3B:
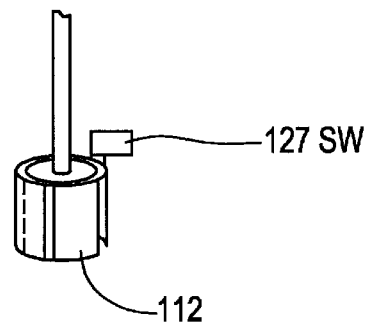
FIG. 3B illustrates the second specific example of the first embodiment of a communication apparatus according to the present invention when the antenna is extracted.

FIGS. 3A and 3B show views illustrating the second specific examples showing the retractable antenna 10, the antenna containing unit 20 and the control unit 40 of the communication apparatus according to the present invention. FIG. 3A shows the retractable antenna 10 contained and FIG. 3B shows the antenna 10 extended.

According to FIG. 3A, the retractable antenna 10 attached to a cabinet 100 of the communication apparatus is provided with the front end portion 111 and the power feeding portion 112 at its two ends. The front end portion 111 is exposed to outside of the cabinet 100 and the power feeding portion 112 is disposed inside of the cabinet 100 of the communication apparatus.

The antenna containing unit 20 includes a power feeding portion 126 and a switch 127. The switch 127 transmits a detection signal to the control unit 40 shown in FIG. 1 when the switch is in its ON state. When the retractable antenna 10 is contained, the switch 127 is brought into an OFF state. The switch 127 is disposed at inside of the cabinet 100 of the communication apparatus. The switch 127 is preferably a microswitch since the communication apparatus is generally used as a mobile station.

When the retractable antenna 10 is extended from the cabinet 100 as shown in FIG. 3B, the switch 127 is changed into the ON state by bringing the power feeding portion 112 into contact with the switch 127 or depressing it. Thereby, the control unit 40 shown in FIG. 1 receives the detection signal and controls the communication function unit 30 based thereon. In this case, the detection signal is transmitted to the control unit 40 only when the power feeding portion 112 is brought into contact with the switch 127 or depresses it.

Next, a description of the operation of a first embodiment according to the present invention in reference to the drawings is given.

FIGS. 4A, 4B and 5 are flowcharts showing an operation of the first embodiment of a communication apparatus according to the present invention.

FIG. 4A is a flowchart showing a signal reception response operation and a speech start operation of a communication apparatus of the first embodiment according to the present invention.

First, in correspondence with a user's operation for extending the retractable antenna 10 contained in the antenna containing unit 20 (step A1), a detection signal indicative of a speech start signal is transmitted from the switching unit 21 in the antenna containing unit 20 to the control unit 40 (step A2). Upon receiving the speech start signal, when the communication function unit 30 is receiving a signal for establishing a channel connection from another communication apparatus through a base station and the retractable antenna 10 (step A3), the control unit 40 executes a channel connection by controlling the communication function unit 30 to receive the signal from the base station and shifts to a speech state (step A4). Alternatively, when the communication function unit 30 is not receiving a signal for establishing a channel connection from the another communication apparatus 10 (step A3), the control unit 40 causes the communication function unit 30 to execute a signal transmitting operation (step A5).

In this case, the signal transmitting operation indicates an address input awaiting state for awaiting input of an address comprising a telephone number of a communication counter party with the user input via the inputting unit 33 or generation of a call for requesting a channel connection based on the inputted address.

FIG. 4B is a flowchart showing the operation of the communication apparatus in receiving a signal from a base station and relates to step A3 shown in FIG. 4A.

First, when a receiving signal from a base station is received by the retractable antenna 10 (step A6), the receiving signal is transmitted to the communication function unit 30 and the informing unit 32 informs the user of reception of the receiving signal (step A7). Further, the communication function unit 30 informs the control unit 40 of reception of the receiving signal (step A8). During a time period when the receiving signal is received by the retractable antenna 10 (step A9), operation of step A7 and operation of step A8 are repeated. When the receiving signal is no longer received by the retractable antenna 10 (step A9), the operation of informing the user of the signal reception shown by step A7 and the operation of informing the control unit 40 of the signal reception shown by step A8 are ended (step A10).

In this case, determination at step A3 by the control unit 40 corresponds to presence or absence of a signal from the communication function unit 30 informing the control unit 40 of the signal reception shown by step A8.

Operation at step A1 through step A4 is executed as the signal reception response operation carried out by the user in correspondence with the operation of informing the user of signal reception shown by step A7.

FIG. 5 shows a flowchart showing a speech end operation and a transmitting operation stopping operation of the first embodiment of the communication apparatus according to the present invention.

First, the retractable antenna 10 is contained within the antenna containing unit 20 by the user of the communication apparatus (step B1). In correspondence with detection of the antenna retracting operation or the antenna contained state, a detection signal indicative of a speech end signal is transmitted from the switching unit 21 in the antenna containing unit 20 to the control unit 40 (step B2). In this case, when the communication function unit 30 is brought into a state of being connected to the communication counter party (step B3), the control unit 40 controls the communication function unit 30 to end the channel connection with the communication counter party, and the communication function unit 30 ends the channel connection (step B4).

On the other hand, when the communication function unit 30 is not in the state of being connected to the communication counter party (step B3), and when the communication function unit 30 is executing a transmitting operation (step B5), the control unit 40 requests the communication function unit 30 to stop the transmitting operation, and the communication function unit 30 stops the transmitting operation (step B6).

The first embodiment of the present invention relates to constitution and operation only in correspondence with containment and extension of the retractable antenna 10 to and from the antenna containing unit 20 in controlling operations related to transmission and reception of a signal.

Other than the above-described, a second embodiment according to the present invention will be discussed in reference to the drawings as follows.

Figure 6:
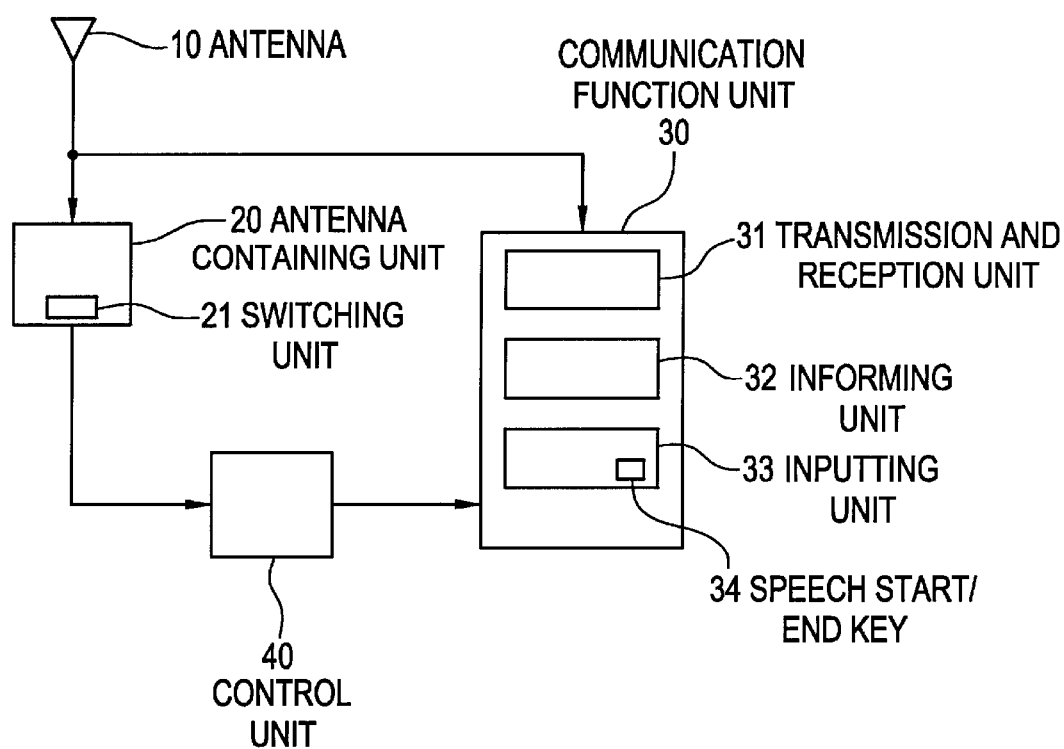
FIG. 6 is a block diagram showing a constitution of a second embodiment of a communication apparatus according to the present invention.

FIG. 6 is a block diagram showing the second embodiment of a communication apparatus according to the present invention.

A difference with the first embodiment of the present invention resides in further comprising a speech start/end key 34 in the inputting apparatus 33 of the communication function unit 30.

Further, the control unit 40 is further provided with a function of controlling the communication function unit 30 by receiving a speech start/end signal in correspondence with input from the speech start/end key 34.

Next, operation by the second embodiment of the present invention will be discussed below in reference to the drawings.

FIGS. 7A, 7B, 8A and 8B are flowcharts showing an example of operation of the communication apparatus according to the second embodiment of the present invention.

Figure 7A:
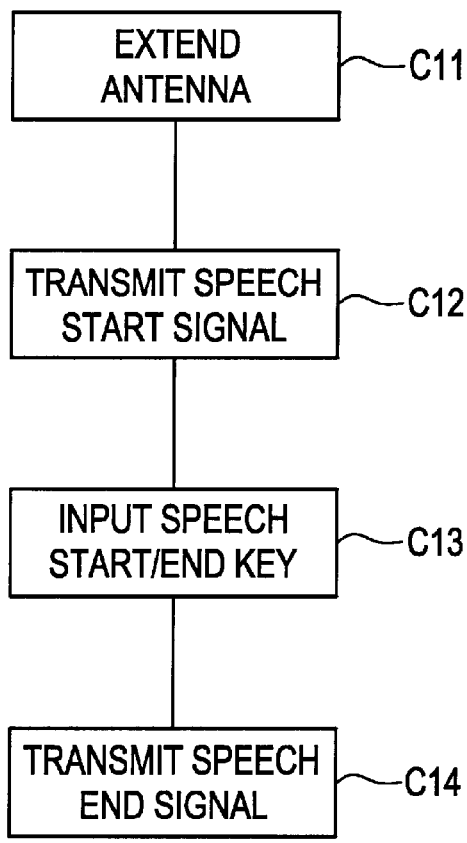
FIG. 7A is a flowchart showing an operation of the second embodiment according to the present invention when an antenna extending operation is executed before inputting a speech start/end key shown in FIG. 6.
Figure 7B:
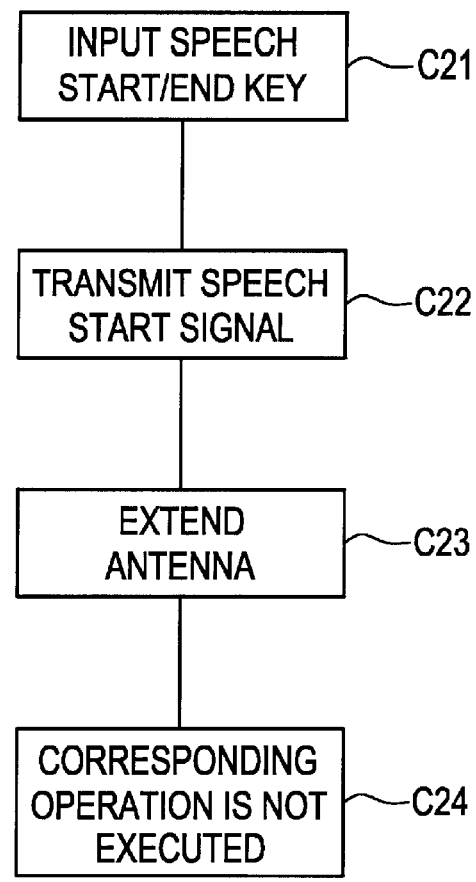
FIG. 7B is a flowchart showing an operation of the second embodiment according to the present invention when an antenna extending operation is executed after an inputting a speech start/end key shown in FIG. 6.

FIGS. 7A and 7B illustrate flowcharts showing a correlation between an operation of extending the antenna 10 and an operation of inputting via the speech start/end key 34 with respect to the signal reception response operation and the speech start operation in the communication apparatus according to the second embodiment of the present invention.

FIG. 7A shows a flowchart for executing the operation of inputting via the speech start/end key 34 after the operation of extending the antenna 10.

First, in correspondence with the antenna extending operation (step C11), a detection signal indicative of a speech start signal is transmitted from the switching unit 21 to the control unit 40 (step C12). Hereinafter, operation indicated in step A3 through step A5 shown in FIG. 4A is executed. Next, in correspondence with the operation of inputting via the speech start/end key 34 (step C13), a speech start/end signal is transmitted from the communication function unit 30 to the control unit 40 (step C14). The control unit 40 determines the speech start/end signal as a speech end signal which is opposite to the speech start signal received at step C12, hereinafter, the operation shown by step B3 through step B6 shown in FIG. 5 is executed.

FIG. 7B shows a flowchart of executing the antenna extending operation after the operation of inputting via the speech start/end key 34.

First, in correspondence with the operation of inputting via the speech start/end key 34 (step C21), the speech start/end signal is transmitted from the communication function unit 30 to the control unit 40 (step C22). The control unit 40 determines the signal as the speech start signal when not in a speech mode, and the operation indicated from step A3 through step A5 shown in FIG. 4A is executed. Next, in correspondence with the antenna extending operation (step C23), the detection signal indicative of the speech start signal is transmitted from the switching unit 21 to the control unit 40 (step C24). At this occasion, the operation indicated from step A3 through step A5 shown in FIG. 4A in correspondence with the speech start signal from the switching unit 21 is not executed. That is, the antenna extending operation (step C23) does not play the role of the switch.

In this case, step C24 can include an operation which does not execute transmission per se of the speech start signal from the switching unit 21 to the control unit 40 in correspondence with the antenna extending operation at step C23.

FIGS. 8A and 8B illustrate flowcharts indicating a correlation between the antenna extending operation and the operation of inputting via the speech start/end key with respect to the speech ending operation and the transmitting operation stopping operation in the communication apparatus according to the second embodiment of the present invention.

FIG. 8A shows a flowchart for executing the operation of inputting via the speech start/end key after the antenna containing operation.

First, in correspondence with an operation of containing the retractable antenna (step D11), a detection signal indicative of the speech end signal is transmitted from the switching unit 21 to the control unit 40 (step D12). Hereinafter, the operation indicated by step B3 through step B6 shown in FIG. 5 is executed. Next, in correspondence with the operation of inputting via the speech start/end key 34 (step D13), the speech start/end signal is transmitted from the communication function unit 30 to the control unit 40 (step D14). The control unit 40 determines the signal as the speech start signal which is opposite to a speech end signal received at step D12, and the operation indicated by step A3 through step A5 shown in FIG. 4A is executed.

FIG. 8B shows a flowchart of executing the antenna containing operation after the operation of inputting via the speech start/end key 34.

First, in correspondence with the operation of inputting via the speech start/end key 34 (step D21), the speech start/end signal is transmitted from the communication function unit 30 to the control unit 40 (step D22). The control unit 40 determines the signal as the speech end signal when in a speech mode, and the operation indicated by step B3 through step B6 shown in FIG. 5 is executed. Next, in correspondence with operation of containing the retractable antenna 10 (step D23), the detection signal indicative of the speech end signal is transmitted from the switching unit 21 to the control unit 40 (step D24). At this occasion, the operation indicated by step B3 through step B6 shown in FIG. 5 in correspondence with the speech end signal is not executed. That is, the antenna containing operation (step D23) in this case does not play the role of the switch.

In this case, step D24 can constitute an operation in which transmission per se of the speech end signal from the switching unit 21 to the control unit 40 in correspondence with the antenna containing operation at step D23 is not carried out.

The second embodiment according to the present invention relates to constitution and operation when operation of containing and extending the retractable antenna 10 to and from the antenna containing unit 20 corresponds to the operation of inputting via the speech start/end key in controlling operations related to transmission and reception of a signal.

Further, a third embodiment according to the present invention will be discussed below with reference to the drawings.

Figure 9:
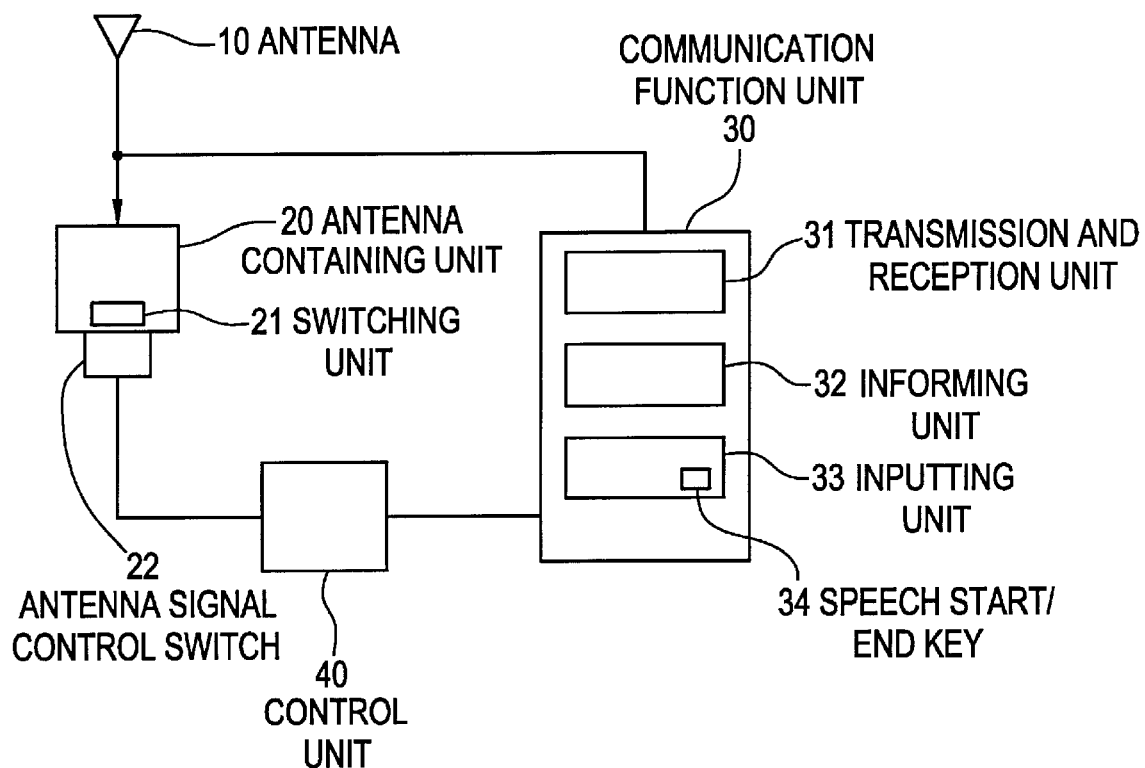
FIG. 9 is a block diagram showing a constitution of a third embodiment of a communication apparatus according to the present invention.

FIG. 9 is a block diagram showing a communication apparatus according to the third embodiment of the present invention.

A difference with the second embodiment of the present invention resides in further providing an antenna signal control switch 22.

The antenna signal control switch 22 changes operation whether the operation of starting or ending speech in correspondence with extension or containment of the retractable antenna 10 to and from the antenna containing unit 20 is executed or not.

The antenna signal control switch 22 shown here is an ON/OFF change-over switch. When the antenna signal control switch 22 is turned ON, a detection signal can be transmitted from the switching unit 21 to the control unit 40 and when the antenna signal control switch 22 is turned OFF, a detection signal cannot be transmitted from the switching unit 21 to the control unit 40.

Figure 10A:
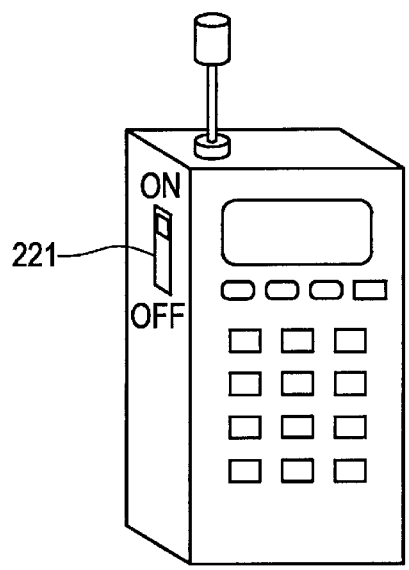
FIG. 10A illustrates a third specific example of a third embodiment of a communication apparatus according to the present invention when an antenna is contained.
Figure 10B:
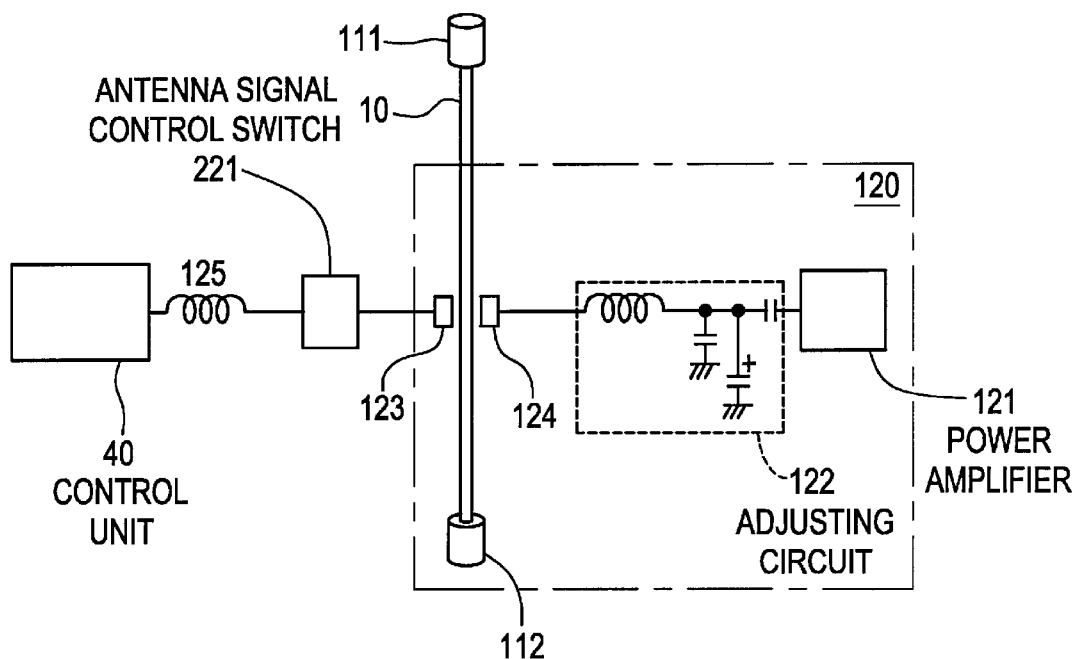
FIG. 10B illustrates the third specific example of the third embodiment of a communication apparatus according to the present invention when an antenna is extracted.

FIGS. 10A and 10B illustrate diagrams showing a third specific example of a communication apparatus according to the third embodiment of the present invention. FIG. 10A shows a perspective view of a cabinet of the communication apparatus and FIG. 10B shows the retractable antenna 10, the antenna containing unit 20 including the board 120 and the control unit 40.

According to FIG. 10A, the communication apparatus according to the present invention has an antenna signal control switch 221 attached at a surface of a cabinet.

According to FIG. 10B, in addition to the first specific example of the present invention shown by FIGS. 2A and 2B, there is provided the antenna signal control switch 221.

The antenna signal control switch 221 comprises an ON/OFF change-over switch, is installed between the board 120 and the choke coil 125, and controls the communication apparatus to apply the voltage applied from the power amplifier 121 arranged on the board 120 to the control unit 40 via the choke coil 125. Although, according to FIG. 10B, the antenna signal control switch 221 is installed between the board 120 and the choke coil 125, the antenna signal control switch 221 may be installed at any position capable of providing ON/OFF transmission of the voltage applied from the power amplifier 121 to the control unit 40 and can be installed at an arbitrary location between the rectifying circuit 122 and the control unit 40.

Specifically, when the antenna signal control switch 22 is turned ON, the antenna containing unit 20 and the control unit 40 are brought into an electrically connected state and the voltage applied by the power amplifier 121 is applied to the control unit 40. When the antenna signal control switch 22 is turned OFF, the power amplifier 121 and the control unit 40 are brought into an electrically noncontact state, the voltage applied by the power amplifier 121 is dropped to Ground by the rectifying circuit 122 and is not applied to the control unit 40.

As has been explained above, the speech start operation or the speech end operation with respect to transmission and reception of a signal can be carried out by either of extraction and retraction of the antenna and depression of the speech start/end key on the keyboard at the surface of the main body of the portable telephone. For example, by extending the antenna speech is started, and then by depressing the speech start/end key the speech is stopped. Further, it is possible to carry out an operation in which speech is started by previously depressing the speech start/end key and then extending the antenna, and after that the speech is stopped by containing the antenna without depressing the speech start/end key.

Thereby, there is pointed out an effect of improving operational performance in which either of two operations of extraction and retraction of the antenna and depression of the speech start/end key on the keyboard at the surface of the main body of the portable telephone is carried out or both operations are simultaneously carried out.

Further, by installing the ON/OFF change-over switch capable of switching use/nonuse of speech start/speech end operation by the antenna at a side face of the portable telephone, use/nonuse of the speech start/speech end operation by the antenna can be freely switched from the outside by a user, and thereby achieving the effect of promoting convenience.

The invention may be embodied in other specific forms without departing from the spirit or essential characteristics thereof. The present invention embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A communication apparatus comprising:
    a retractable antenna;
    a controller requesting a channel connection in response to extraction of said retractable antenna provided that a signal for establishing a channel connection is not being received via said retractable antenna, and replying to the signal for establishing a channel connection in response to extraction of said retractable antenna, if the signal is received via said retractable antenna, whereby the channel connection is established; and
    a key for requesting the channel connection when said key is depressed provided that said retractable antenna is retracted and said signal for establishing the channel connection is not received through said retractable antenna before said key is depressed;
    wherein when a request signal for channel connection is transmitted through said retractable antenna which is extracted, said controller stops transmission of the request signal in response to retraction of said retractable antenna.

2. The communication apparatus as claimed in claim 1, wherein said controller ends the channel connection in response to retraction of said retractable antenna if the channel connection has been established.

3. The communication apparatus as claimed in claim 2, wherein said controller has a detector for detecting said extraction and said retraction of said retractable antenna.

4. The communication apparatus as claimed in claim 1, wherein said key is depressed for ending the channel connection if the channel connection is established and said retractable antenna is extracted before said key is depressed.

5. The communication apparatus as claimed in claim 4, wherein said controller has a detector for detecting said extraction and said retraction of said retractable antenna when said key is depressed.

6. The communication apparatus as claimed in claim 5, wherein said controller determines an operation in response to depression of said key according to the state of said retractable antenna detected by said detector.

7. The communication apparatus as claimed in claim 1, further comprising:
   a switch for prohibiting said controller from performing an operation in response to extraction of said retractable antenna.

8. A mobile station comprising:
   a body;
   a containable antenna disposed in said body;
   a controller for executing a speech start operation in response to extraction of said containable antenna from said body said controller requesting a channel connection upon extraction of said containable antenna provided that a signal for establishing a channel connection is not being received; and
   a key for requesting the channel connection when said key is depressed, provided that said containable antenna is contained;
   wherein said controller ends the channel connection in response to retraction of said containable antenna if the channel connection has been established.

9. The mobile station as claimed in claim 8, wherein said controller includes:
   a detector for detecting the extraction of said containable antenna from said body to output a detection signal.

10. The mobile station as claimed in claim 9, further comprising:
    a switch for prohibiting an operation performed by said control unit in response to extraction of said containable antenna.

11. The mobile station as claimed in claim 10, wherein said switch prohibits outputting the detection signal.

12. The mobile station as claimed in claim 8, wherein when a request signal for establishing the channel connection is transmitted through said containable antenna which is extracted, and said controller stops the transmission of the request signal in response to retraction of said containable antenna.

13. The mobile station as claimed in claim 8, further comprising:
    a transmission and reception unit for transmitting a transmission signal and receiving a reception signal via said containable antenna.

14. The mobile station as claimed in claim 13, further comprising;
    an informing unit for informing a user of the mobile station that said transmission and reception unit receives the reception signal through said containable antenna.

15. The mobile station as claimed in claim 8, further comprising:
    a plurality of keys for inputting a telephone number.

16. A method of operating a communication apparatus, comprising:
    detecting a state of a retractable antenna retractable with respect to a body;
    requesting a channel connection when extraction of the retractable antenna from the body is detected, provided that a signal for establishing a channel connection is not being received through the retractable antenna;
    depressing a key therby requesting the channel connection provided that the signal for establishing the channel connection is not being received and retraction of the retractable antenna is detected before the key is depressed; and
    depressing a key thereby ending the channel connection if the channel connection has been established and extraction of the retractable antenna is detected before the key is depressed.

17. The method as claimed in claim 16, further comprising:
    responding to the signal for establishing the channel connection when extraction of the retractable antenna from the body is detected if the signal is received through the retractable antenna.

18. The method as claimed in claim 16, further comprising:
    ending an established channel connection when the retractable antenna is retracted and the retraction of the retractable antenna is detected.

19. The method as claimed in claim 16, further comprising:
    stopping the requesting of the channel connection occurring before the retractable antenna is retracted and retraction of the retractable antenna is detected.

20. The method as claimed in claim 16, further comprising:
    informing a user of the communication apparatus that a signal is received from another communication apparatus.

* * * * *